US005481639A

United States Patent [19]
Cobb et al.

[11] Patent Number: 5,481,639
[45] Date of Patent: Jan. 2, 1996

[54] COMPACT CLOSURE FOR OPTICAL FIBER CABLE

[75] Inventors: Gary S. Cobb, Norcross; Wesley W. Jones, Lawrenceville; John F. Malluck, Marietta, all of Ga.

[73] Assignee: AT&T Corp., Murray Hill, N.J.

[21] Appl. No.: 330,417

[22] Filed: Oct. 28, 1994

[51] Int. Cl.$^6$ ................................ G02B 6/00; G02B 6/36
[52] U.S. Cl. ............................................................ 385/135
[58] Field of Search .................................... 385/135, 147

[56] References Cited

U.S. PATENT DOCUMENTS

| | | | |
|---|---|---|---|
| 4,266,853 | 5/1981 | Hutchins et al. | 385/135 |
| 4,332,435 | 6/1982 | Post | 350/96.2 |
| 4,679,896 | 7/1987 | Krafcik et al. | 385/135 |
| 4,913,522 | 4/1990 | Nolf et al. | 385/135 |
| 4,927,227 | 5/1990 | Bensel, III et al. | 350/96.2 |
| 5,185,845 | 2/1993 | Jones | 385/135 |
| 5,280,556 | 1/1994 | Jones | 385/139 |

Primary Examiner—Akm E. Ullah
Attorney, Agent, or Firm—Michael A. Morra

[57] ABSTRACT

An optical fiber cable closure (20) includes a cable termination assembly (100) and a cover (23) into which the termination assembly is inserted. The cable termination assembly includes a cable entry (30) having an environmental seal through which cables (28—28) containing optical fibers are routed into the closure. The termination assembly also includes a support frame (101) which has a free end that extends from the cable entry and is enclosed by the cover. Extending upwardly from and attached to the support frame are a pair of spaced-apart parallel track members (112—112) for stacking optical fiber splicing trays (120) in a compact manner. Each tray includes a pair of spaced-apart openings (128—128) along one end. These parallel track members pass through the spaced-apart openings in the tray to create a slideable connecting arrangement which enables trays of varying thickness to be efficiently stacked within the same closure. Optical fibers from each incoming cable are routed in individual tubes (29—29) or as ribbons from an optical fiber breakout (140) mounted on the frame to selected ones of the trays. The trays are provided with a plurality of organizing modules (125—125)—each of which is adapted to hold a plurality of optical fiber connective devices.

12 Claims, 5 Drawing Sheets

COMPACT CLOSURE FOR OPTICAL FIBER CABLE

TECHNICAL FIELD

This invention relates to an optical fiber cable closure. More particularly, this invention relates to an enclosure having increased storage capability, improved convenience, and lower cost.

BACKGROUND OF THE INVENTION

The use of communication cables which include a plurality of optical fibers is rapidly expanding. An optical fiber cable may comprise a plurality of glass fibers—each of which is protected by at least one layer of a coating material. The optical fibers may be assembled into units in which the fibers are held together by binder ribbons or within tubes to provide a core. Another optical fiber cable core includes a ribbon type optical fiber arrangement in which a plurality, such as twelve fibers for example, are arrayed together side by side. A plurality of these ribbons may be stacked to obtain a high fiber count cable. The core is enclosed by a plastic core tube(s) and a plastic jacket. Ribbon type cable in which a relatively large number of optical fibers may be packaged appears to be ideally suited for fiber-to-the-customer use.

Whatever the structure of a cable, there must be provisions for splicing transmission media at an end of a given length of cable to corresponding transmission media at an adjacent end of another length of cable. When metallic conductors are present, it is conventional to use a splice closure, within which strength members of the cable ends are anchored and all conductors spliced, wrapped, stored and environmentally protected. Typically, during the splicing of metallic conductors, the conductors are sharply bent to provide access to other connections.

The physical nature of optical fibers precludes the adoption of splicing techniques which are used with metallic conductors within such a splice closure. Because of their small size and relative fragility, special considerations must be given to the handling of optical fibers in closures. Transmission capabilities may be impaired if an optical fiber is bent beyond an allowable bending radius, the point at which light no longer is totally contained in the core of the fiber. Furthermore, fibers are brittle and their expected lives will be reduced if bent more than the minimum bending radius. Generally, the radius to which the optical fiber can be bent without affecting orderly transmission is substantially greater than that radius at which the optical fiber will break. Whereas glass and silica, the materials used to make optical fibers, are in some respects stronger than steel, optical fibers normally do not possess this potential strength because of microscopic surface fractures, which are vulnerable to stress and spread, causing the fiber to break easily.

It should be clear that an optical fiber cable does not lend itself to the splicing practices of metallic communication conductors. Individual optical fibers cannot just be twisted, tied, wrapped and moved into a splice closure in anything like the manner of metallic conductor cables. These small-diameter glass fibers cannot be crimped or bent at small angles without breakage. Inasmuch as glass fibers have memory and tend to return to a straight-line orientation, placement in a splice closure becomes somewhat difficult. Moreover, the interconnection of optical fibers is a precision operation which in the past has tended to discourage some from performing splicing operations within a manhole, in a handhole, or a pole-suspension elevation. And yet, to do otherwise becomes more expensive.

These problems are particularly acute in multifiber cables where individual optical fibers must be spliced in a manner which allows repairs and rearrangements to be made in the future. In addition, fiber slack normally must be provided adjacent to the splices. The need to store the slack further complicates the problem of providing a suitable optical fiber closure.

When splicing optical fibers by fusion or by mechanical means, it becomes necessary to provide enough slack fiber so that the fiber can be pulled out of the splice case for the preparation of fiber ends and the joining together. This requires at least about 0.5 meter of fiber from each cable to be stored in the splice closure when the closure is sealed, that is when the splicing has been completed. For a multifiber cable there must be a method of storing this slack, of protecting the splice, and of keeping the fibers together in an orderly manner. The splices should be easily accessible to facilitate the rearrangement of the individual optical fibers and splices. Additionally, it has become common practice to loop an optical cable through the closure and access only certain fibers, ribbons or units for splicing to others. The remaining fibers (designated "express" fibers, ribbons or units) must be stored in the closure. The length of these stored transmission media may be as much as 13 feet in length.

Optical fiber connecting arrangements must be protected from forces which could distort their shape or pull the fibers out of the arrangements. Although it is important that large forces are not applied to the connective arrangements, it also is important that they be secured in position. Any axial or torsional movement thereof could cause movement of the fibers which could cause attenuation of the optical signal being transmitted therealong. As must be expected, fiber splice organizers and splice closures are available in the prior art. These prior art organizers and closures have suffered from a variety of shortcomings. Typically, they have been somewhat complex, difficult to use and difficult to access. Moreover, they do not accommodate a large enough number of splices in a compact space.

For example, U.S. Pat. No. 4,913,522 discloses an optical fiber organizer which accommodates about 8 to 10 trays, and each tray may store from 5 to 20 optical fibers. The trays are stacked, one on top of the other, and each is hinged separately at one end thereof to a carrier, thus allowing them to move relative to one another like bound pages. In a preferred embodiment, it accommodates about 100 fibers which is somewhat low in view of the projected number of fiber users in a society wired for connection to the "information superhighway."

U.S. Pat. No. 4,927,227 discloses an optical fiber cable closure in which a support member comprises a support base for supporting an optical fiber breakout and a plurality of splice trays. However, there appears to be limited storage capacity and lack of ability to accommodate as many different splicing arrangements as desired. Current thinking would require each tray to store at least thirty-six splices.

U.S. Pat. No. 5,185,845 discloses an optical fiber closure having enhanced storage capability in which each tray stores thirty-six splices, but the closure only handles about six trays which provides a total capacity of about 216 splices. In each of the above patents, trays are individually hinged at one end in a stair-step manner which is not particularly space efficient. Additionally, the stair-step design of the prior art accommodates only one tray size. Further, end-hinging plastic members are used and they must be carefully engineered to handle substantial stress in the event that the closure is dropped or when the trays are oriented vertically (e.g., when splicing work is being done in a lower tray).

What the prior art appears to lack is an optical fiber cable closure of low-cost construction which provides more efficient space utilization and a simpler, stronger hinging apparatus. Further, a compact closure which is capable of handling an increased number of splices is desirable. And finally, a closure which efficiently accommodates trays of varying thickness is needed.

SUMMARY OF THE INVENTION

The problems of prior art optical fiber closures have been overcome by an optical fiber cable closure of this invention. The closure comprises a cable termination assembly surrounded by a protective cover. The cable termination assembly includes a frame that supports several trays—each of which holds a number of optical fiber connecting arrangements (e.g., splices). Extending upwardly from and attached to the support frame are a pair of spaced-apart parallel track members for stacking trays in a compact manner. Each tray includes a pair of spaced-apart connecting members along one of its sides that are slideably joined to the parallel track members.

In an illustrative embodiment of the invention, the spaced-apart parallel track members comprise the center section of a generally U-shaped wireform whose top and bottom sections reside in different parallel planes—each being perpendicular to the center section. Molded into the support frame are details that are shaped to receive and support the bottom section of the U-shaped wireform without the use of fasteners. In the illustrative embodiment of the invention, the cover is substantially cylindrical and is open at one end only. The closure is capable of stacking up to eight trays; and since each tray holds thirty-six fiber-connecting arrangements, the closure of the present invention handles 288 individual fiber connections.

The sliding relationship between the trays and the track members, as taught in the present invention, allows the trays within the same closure to be of different thickness and still be compactly stacked. Prior art closures, wherein the trays are joined to the support frame in a fixed-hinge relationship, effectively preclude trays of different thickness from coexisting efficiently within the same closure. Such closures are obviously not well suited to handle future trends in tray thickness and will need to be replaced, for example, when the larger trays needed to handle mass-fusion splices are introduced. But since optical fiber closures using the present invention easily accommodate trays of different thickness, they will have improved future utility.

BRIEF DESCRIPTION OF THE DRAWING

Other features of the present invention will be more readily understood from the following detailed description of specific embodiment thereof when read in conjunction with the accompanying drawing, in which.

DETAILED DESCRIPTION

Figure 1A:
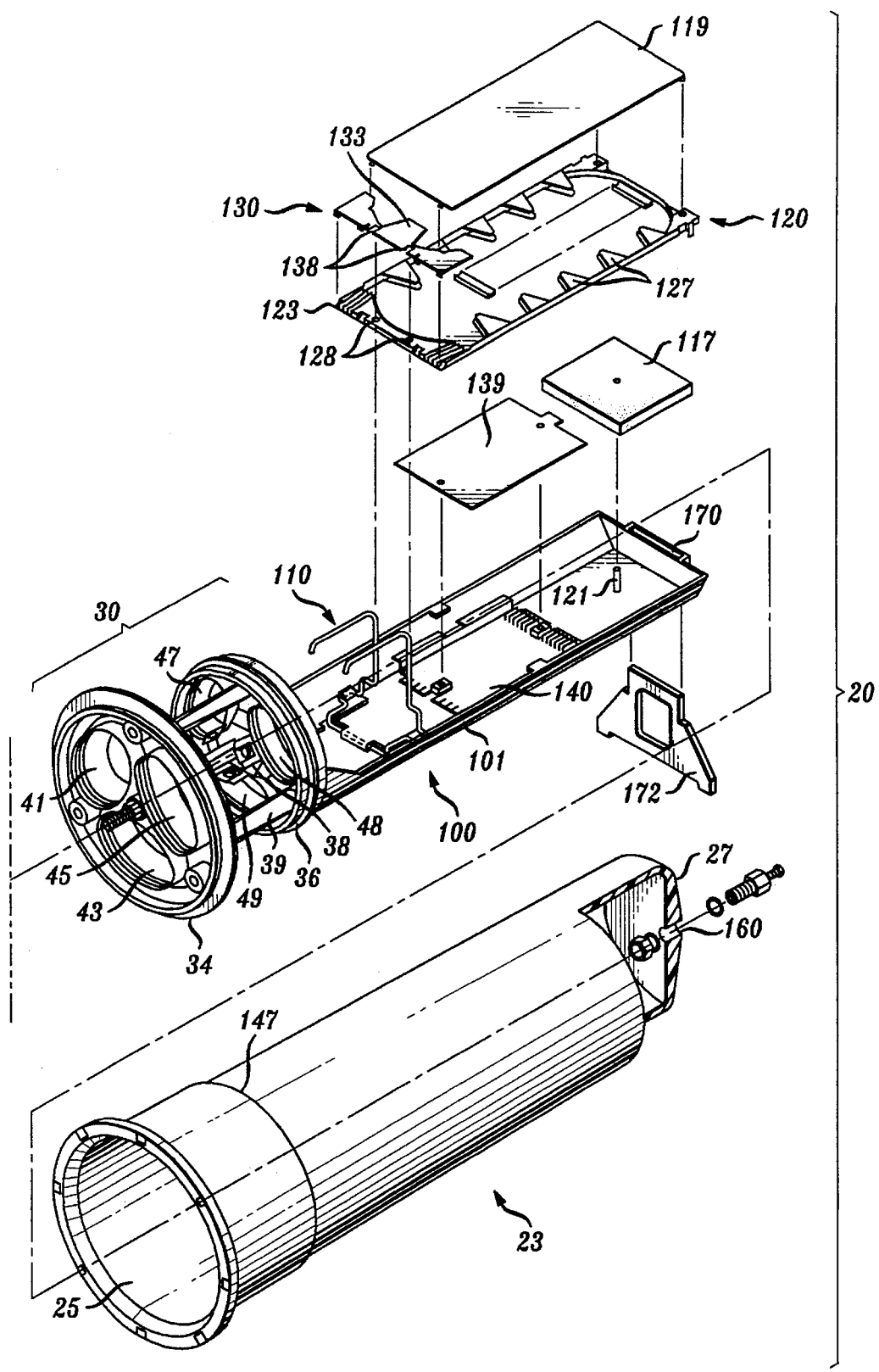
FIG. 1A and 1B is an overall perspective view of a closure of the invention which includes a cable splicing termination assembly and a cover.
Figure 1:
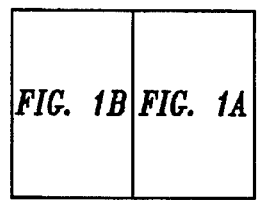
FIG. 1, comprising
Figure 1B:
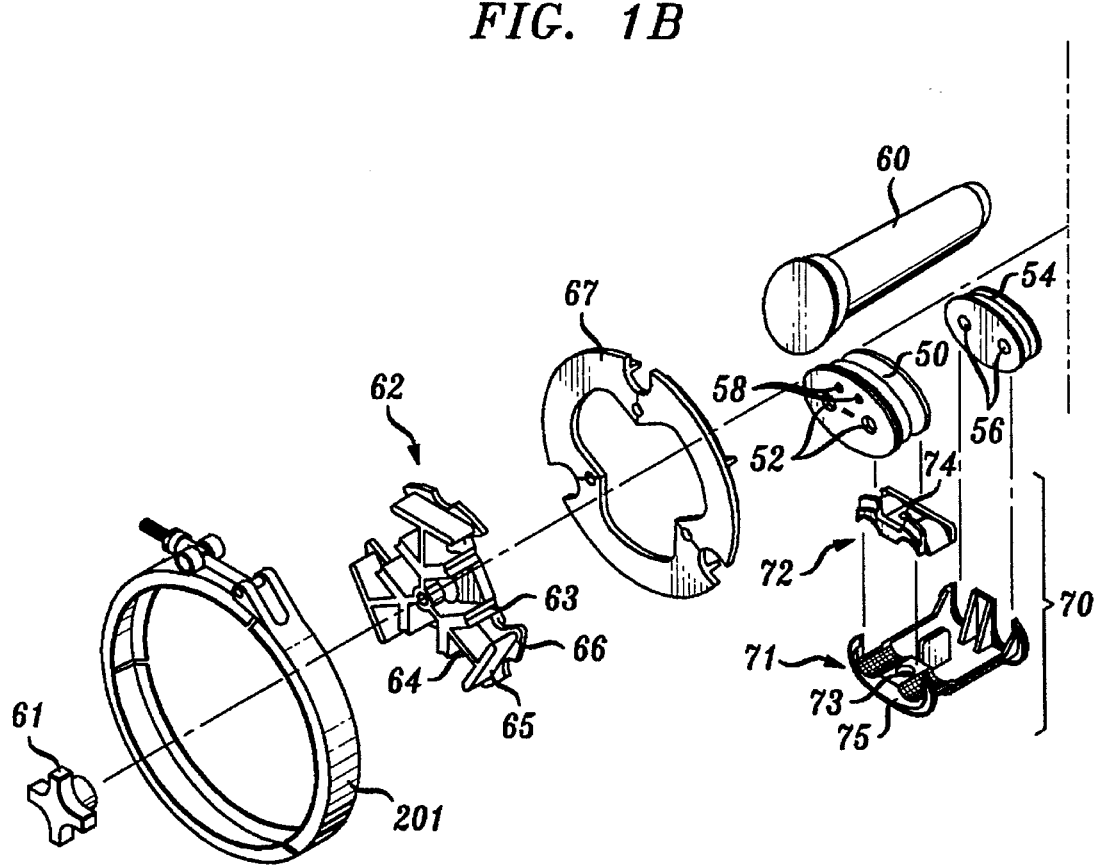

Referring now to FIG. 1A and 1B, which hereinafter will be referred to as FIG. 1, there is shown an optical fiber cable closure which is designated generally by the numeral 20. The closure 20 includes a cable splicing termination assembly which is designated generally by the numeral 100 and in which optical fibers are spliced/stored and a cover 23. The cover 23 is cylindrically shaped and includes an open end 25 and a closed end 27. In order to assemble the cable termination assembly 100 with the cover 23, the cable splicing termination assembly is inserted into the open end 25 of the cover and moved toward the closed end 27. Closure 20 is designed to accommodate a plurality of cables to be spliced or can be used to store optical fibers for future splicing to branch cables.

Substantial detail regarding the general construction of cable splicing termination assembly 100 and cover 23 are contained in U.S. Pat. Nos. 4,927,227 and 5,185,845 which are hereby incorporated by reference. And although much of the detail is included herein, much is also omitted for the sake of brevity.

As can be seen in FIG. 1, the cable termination assembly 100 includes a cable entry portion 30 and a support frame 101. The cable entry portion 30 includes two spaced end plates 34 and 36—each of which is disc shaped with the end plate 34 being referred to as an outer end plate and the end plate 36 being referred to as an inner end plate. Each of the end plates 34 and 36 is made preferably of a molded plastic, glass-reinforced polypropylene. The two end plates 34 and 36 are held in assembled relationship spaced apart by a central stud 38 and three circumferentially-disposed standoffs 39—39 which are molded integrally with the inner end plate 36. Each of the end plates is also provided with three oval-shaped openings with those in the outer end plate 34 being designated 41, 43 and 45; and with those in the inner end plate 36 being designated 47, 48 and 49. Openings in the end plate 34 are aligned with associated ones of the openings in the end plate 36. For example, opening 41 is aligned with the opening 47, 45 with 48, and 43 with 49.

Disposed in the opening 43 is a grommet 50 which is made from an elastomeric material. The grommet 50 includes two passageways 52—52 through which are destined to extend cables 28—28 (see FIG. 4) to be spliced. Similarly, a grommet 54 which is aligned with the grommet 50 and which includes two passageways 56—56 is disposed in the opening 49. Further, the grommet 50 is provided with openings 58—58 to allow passage of ground wires therethrough. Although two cables to be spliced are destined to extend through the passageways 52—52 and 56—56 of the aligned grommets 50 and 54, each ground wire need only extend through the first grommet because it is terminated between the two end plates. Each of the openings 47, 48 and 49 of the inner end plate 36 has a rim thereabout on the inner side of the inner end plate. In this way, the grommets in the inner end plate are prevented from moving through the inner end plate.

Unless it is known from the outset that more than two cables are to be spliced in the closure 20, the other two sets of aligned openings in the end plates are plugged with dummy plugs 60—60. Advantageously, as more cables need to be spliced in the closure 20, the dummy plugs are removed and replaced with a pair of grommets identical to the grommets 50 and 54.

Outboard of the outer end plate 34 is situated a retainer yoke 62 which includes three equiangularly extending ribs 64—64. The central stud 38 which is secured to the end plates 34 and 36 extends through a central opening in the yoke and a knob 61 is turned into the stud to hold the yoke secured in place. The yoke 62 functions to hold the plugs and grommets in place and to stabilize the closure structure. Each of the ribs 64—64 terminates in a cross member 65 and includes two strain-relief portions 63—63 which extend angularly therefrom. An end of strain-relief portion 63 is provided with a V-shaped configuration which is such that it provides support for any expected size cable to be spliced with the closure 20. Each entering cable is secured to an associated strain-relief portion 63 by a cable tie (not shown). The ribs 64—64, as well as the strain-relief portions 63—63 and cross members 65—65, extend for a distance of about 0.75 inch and intersect with a back-up plate 66. No matter which size cable of the expected range of sizes is routed into the closure, the cable engages one of the strain-relief portions 63—63 outside the grommet and hence is prevented from bending excessively at the entrance to the grommet.

Further, between the yoke 62 and the end plate 34 are disposed three arcuately shaped members 67—67, each of which extends between two pins (not shown) that extend in a direction that is perpendicular to the yoke 62. The members 67—67 are effective to hold the grommets and plugs in place in the outer end plate 34.

Disposed between the end plates 34,36 are facilities for securing the cables 28—28 (see FIG. 4) against unintended movement. The manner in which the cables between the two grommets is secured also is important. Suitable securing of the cables in this area will prevent undue forces from being transmitted past the inner grommet to the splice work. Assuming that each of the optical fiber cables includes a corrugated metallic shield, an outer plastic jacket (disposed about the corrugated metal shield) is removed from the cable to a point about midway between the grommets. A core tube of the cable is caused to extend through the inner grommet 54 to the splice area. Also, a portion of the metallic shield is removed so that only a relatively short length extends beyond the end of the plastic jacket.

A cable sheath gripping assembly 70, comprising sheath-grip body 71 and sheath-grip clamp 72, attaches to the pair of cables that extend through the grommet openings. Should any two aligned openings in the grommets not have a cable portion therein, a plastic rod is inserted between the grommets and into the openings so as to seal the two aligned openings. Forces are caused to be applied to the jacket of the cable by the turning of a bolt (not shown) which extends through an opening 74 in clamp 72 and into end block 75 which contains a threaded insert 73. A pair of channels having arcuate ribs are positioned on either side of the end block 75. The ribs are such that they dig into the cable jacket—thereby clamping the cable and preventing relative movement between the cables and the end plate assembly. Additional detail regarding the construction of the cable sheath griping assembly, and the way it fits into the compact cable closure, is contained in U.S. Pat. No. 5,280,556 which is hereby incorporated by reference.

Each of the end plates cooperates with the cover 23 to seal the closure against the unintended ingress of contaminants. The outer and inner end plates 34, 36 are provided with rims, and over each rim (prior to assembly of the termination assembly 100 and cover 23) is placed an O-ring which is made from a compliant sealing material. The cover 23 is formed with a step 147 which, upon assembly, cooperates with the O-ring about the inner end-plate 36 to provide an additional seal.

After the closure 20 has been assembled, it may be pressure tested at 69 kPa to determine if it leaks. This is accomplished via port 160, located at the closed end of the cover, where pressurized gas is introduced. The pressure must be removed before opening the closure.

Also provided are facilities for positioning the closure 20 for splicing operations. An end of the termination assembly 100 is provided with a slotted opening 170 to receive an end of a support foot 172. After the support foot is inserted into the opening, the support foot may be placed in engagement with any flat or substantially flat surface to cooperate with the outer end plate 34 to stabilize the termination assembly 100 so that splicing can be performed. When not being used, the foot 172 may be stored in an opposite end at the opening and protrude into the cover for future use.

Figure 2:
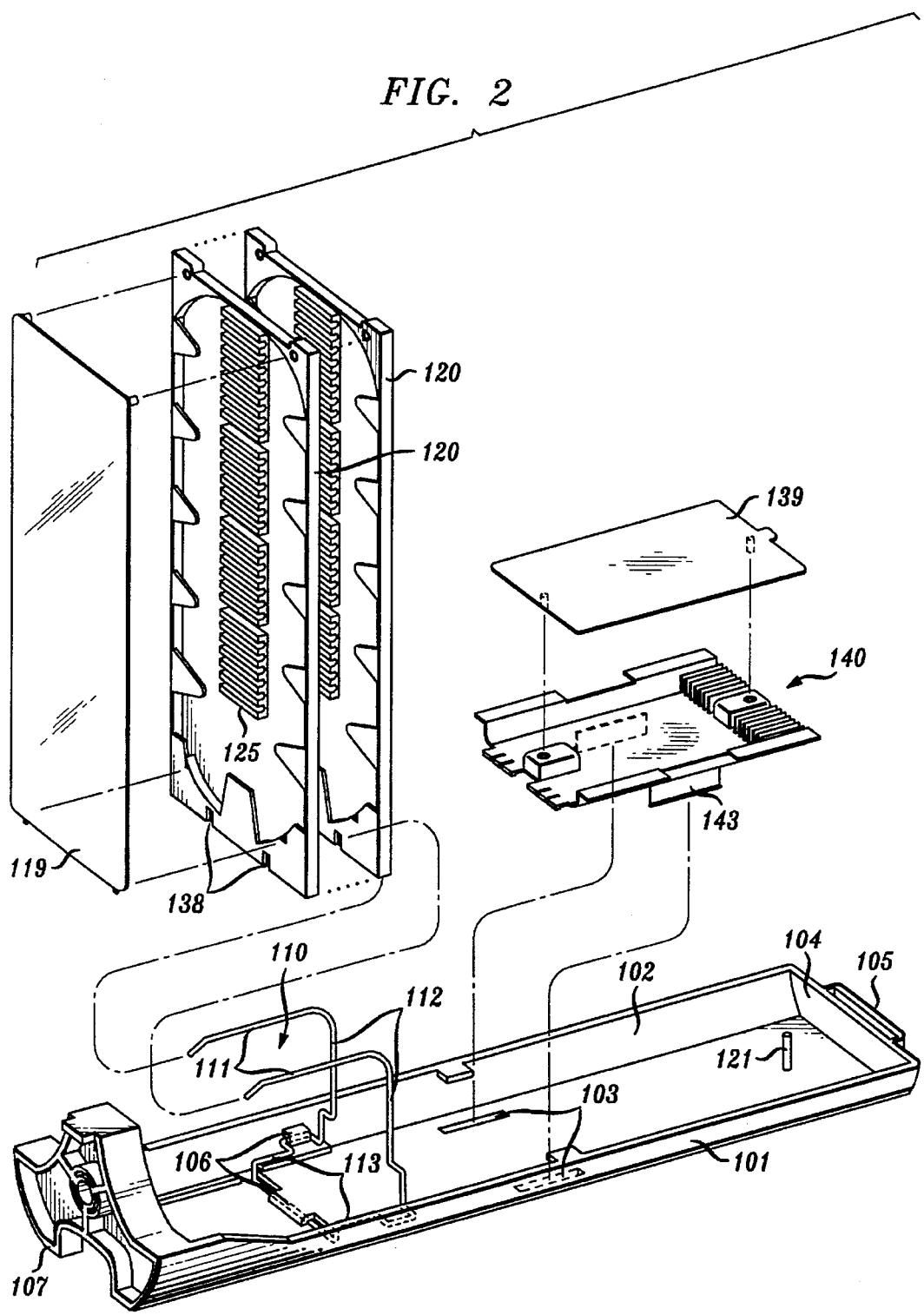
FIG. 2 shows a splice tray and organizing modules of the cable splicing termination assembly in greater detail.

Referring now to FIG. 2, a more detailed description of the cable splicing termination assembly 100 is provided. The assembly 100 includes a support frame 101 having sidewalls 102—102 and an end dam 104 at its free end 105. Mounted on frame 101 is an optical fiber breakout 140 which includes tabs 143—143 that cooperate with slots 103—103 in the frame for securing it relative to the frame. Fiber breakout 140 functions to re-group optical fibers from a cable into various tubes 29—29 (see FIG. 4) for routing to the various splice trays 120. Each group of fibers from the cable is received in a channel formed between partitions in one end of the fiber breakout 140. Within the fiber breakout 140, the optical fibers are organized and inserted in predetermined groups into plastic routing tubes. The tubes are arranged so that one end portion of each is received in a channel formed between partitions at the opposite end of the fiber breakout; that is, the end oriented toward the free end 105 of the frame 101. Fiber breakout cover 139 is positioned on top of breakout 140 to protect the bared, coated optical fibers therein.

After the tubes emerge from the breakout 140, each of the tubes is routed in a retroflexed configuration and directed back toward the inner end plate 36. In that direction, the tubes are routed and secured to selected ones of a plurality of trays 120—120 for the purpose of splicing. Within the free end portion of support frame 101 is disposed a foam pad 117 which is received over pin 121 to cushion fibers which are stored in loops between the breakout 140 and the free end 105 during handling.

Also mounted on support frame 101 is a wireframe 110 which snap locks thereinto. The wireform is illustratively shown as a single piece-part, although it could comprise a pair of spaced-apart parallel tracks that are inserted into bosses, for example, in the frame. As shown, wire frame 110 is a generally U-shaped metal structure whose top and bottom sections 111, 113 reside in different parallel planes—each being perpendicular to a center section 112. The center section comprises a pair of spaced-apart parallel tracks which function to hold and guide splice trays 120 mounted thereon. Molded into support frame 101 are a number of features 106—106 that are shaped to receive and support the bottom section 113 of the U-shaped wireframe without the use of fasteners. In the preferred embodiment of the invention, the top section 111 of wireform 110 is bent at a right angle with respect to its center section 112. The top section not only limits the upward travel of splice trays 120 positioned on parallel tracks 112, it also serves as a support member for storing trays in an upright position while splicing activity takes place in another (horizontally disposed) tray. Preferably the wireform is made from steel because it needs to deal with high stress concentrations when storing trays in the upright position or if the closure is dropped.

Advantageously, wireform 110 eliminates the need for the stair-stepped hinging arrangements of the prior art. By enabling the trays to be stacked exactly on top of each other, a more compact closure is achieved. Moreover, congestion is minimized in the region where tubes containing optical fibers enter the trays; and it is easier to add splice trays to the closure by using spaced-apart parallel tracks.

Trays 120—120 are secured to frame 101 and individually hold a number of optical fiber splices. Illustratively, each tray 120 is made of a plastic material such as polycarbonate, and is adapted to be mounted on wireform 110. Each tray 120 includes a pair of spaced-apart connecting members (cylindrical openings) 128—128 which are positioned to receive wireform 110 so that it can be slideably moved along the wireform. (It is noted at this point that such slideable movement can also be achieved by the use of pins that extend from opposite sides of a tray at one end thereof. These pins can be captured by a pair of parallel grooves that are molded into the sidewalls of the support frame. Naturally, the support frame 101 shown in FIG. 2 would need to be modified by extending its sidewalls 102—102 upwardly in the region where the pins are located.) Each tray 120 also has associated therewith a plate 130 which extends across the tray at the optical fiber entrance end, and includes pins which are received in mating openings in the tray. Plate 130 includes a pair of spaced-apart openings 138—138 which are positioned to accommodate wireform 110. Plate 130 secures incoming tubes of optical fibers or ribbons within channels 123—123. A portion of each tube or ribbon, which is disposed in a channel 123, is wrapped with a foam strip having an adhesive layer that engages surfaces of the tube or ribbons to secure it within the channel. The plate covers these channels thereby securing the tubed fibers or ribbons from unintentional movement. Additionally, tongue 133 serves to restrain loops of slack fiber from being dislodged from the tray 120.

Further, each tray 120 includes a plurality of overhanging portions 127—127. Optical fibers extending from the tubes which enter the trays through channels 123—123 are routed under these portions 127—127 before being turned in toward splicing portions of the tray.

Mounted within each tray 120 are one or more organizing modules 125 for supporting a plurality of commercially available splicing arrangements. Illustratively, each module 125 includes a compliant material (e.g., cellular plastic foam) for holding up to six splices. The compliant material is capable of being compressed as a splicing connector is inserted and to reconfigure itself about the splicing connector in order to hold it securely within an associated nest. Additional detail regarding the design of these modules 125—125 is contained in U.S. Pat. No. 5,185,845 which has already been incorporated by reference.

After splicing has been completed, the craftsperson places a protective cover 119 over the outermost tray 120. (It is noted that the present invention enables the craftsperson to place protective covers over any of the trays because variable tray thickness is possible, whereas the stair-step hinge designs of the prior art are not so accommodating.) The craftsperson then assembles the splicing termination assembly 100 to the cover 23. The termination assembly 100 is inserted into the cover 23 and a clamping band 201 (see FIG. 1) is caused to be disposed about a rim of the cover and the outer end plate 34. The clamping band 201 is tightened about the cover and the end plate to secure them together and to hold the termination assembly in the cover 23. Each of the end plates cooperate with the cover 23 to seal the closure against the unintended ingress of contaminants or the egress of pressurized air.

Figure 3:
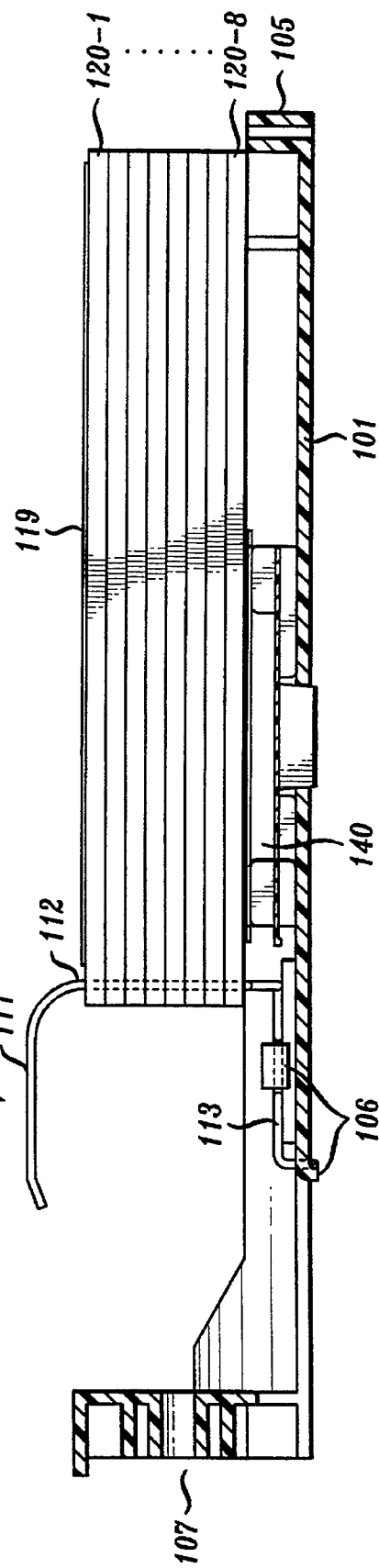
FIG. 3 is a side elevation view of the termination assembly of FIG. 1.
Figure 4:
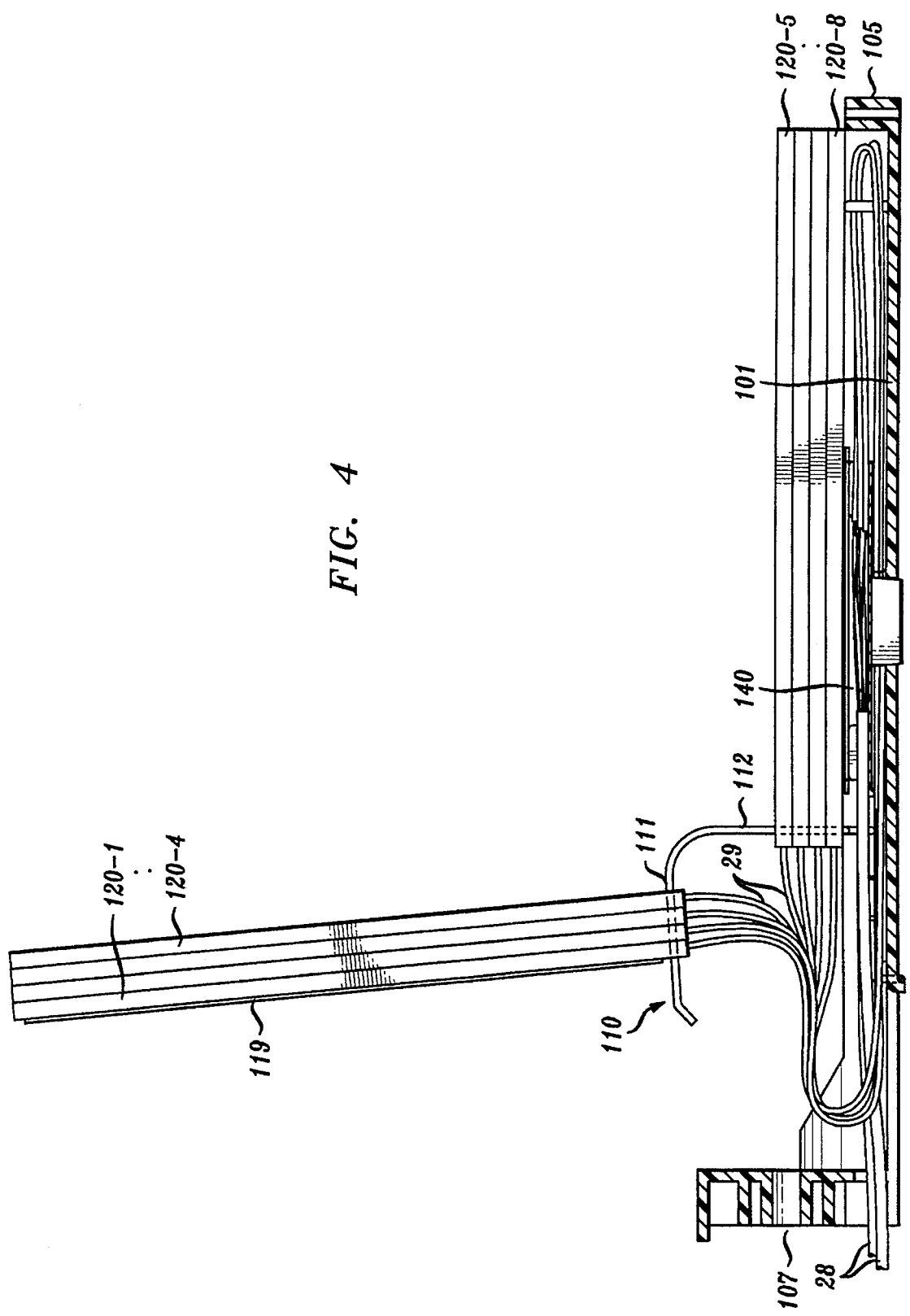
FIG. 4 is a side elevation view of the termination assembly of FIG. 1 showing several splice trays positioned in an upright manner, and illustrating the routing of tubes containing optical fibers.

Shown in FIGS. 3 and 4 are side elevation views, in partial cross section, of the cable splicing termination assembly 100 of FIG. 1. In particular, FIG. 3 illustrates the vertical stacking of eight trays 120-1 through 120-8 and the manner in which wireform 110 attaches to support frame 101. Molding details 106—106 in the frame 101 cooperate with the bottom section 113 of the wireform to secure them together in an easily assembled manner. Upright parallel tracks 112 maintain the trays in a compact vertical alignment. And although not shown, a "hook and loop"-type fastener (Velcro® fastener for example) wraps around the stack of trays and the support frame to firmly hold them together and prevent unintended relative movement during handling.

FIG. 4 illustrates the manner in which optical fibers are routed within the cable termination assembly. For example, cables 28—28 enter assembly 100 at the left-hand side of FIG. 4 and proceed directly to one end of breakout 140 where optical fibers are re-grouped into tubes 29—29. These tubes emerge from the other end of optical fiber breakout 140 and are routed to the various splice trays 120. The tubes are first routed toward the free end 105 of support tray 101, and then, in a retroflexed configuration, toward the cable entry end 107. FIG. 4 also illustrates the utility of the top section of wireform 110. Trays 120-1 through 120-4 are shown in a stored upright position on the top section 111 of wireform 110 in order to enable a craftsperson to perform splicing operations within splice tray 120-5. Trays 120-5 through 120-8 are shown in their normal horizontal position attached to parallel track members 112.

Although a particular embodiment of the invention has been shown and described, it is understood that various modifications are possible within the spirit and scope of the invention. These modifications include, but are not limited to the use of non-metallic parallel tracks to hold the trays, the use of other techniques for attaching the parallel tracks to the support frame, and the use of the present invention in a closure that is open at both ends. Additionally, the parallel tracks of the present invention might also comprise grooves in the sidewalls of the support frame which cooperate with pins in the trays and enable the trays to be slideably mounted within the support frame.

We claim:

1. A compact closure for cables containing optical fiber, said closure comprising a cable termination assembly surrounded by a protective cover, the cable termination assembly comprising:

a support frame;

a plurality of fiber connection trays mounted on the support frame for storing loops of optical fiber therein, each tray being adapted to hold at least one optical fiber connecting arrangement, and each tray including a pair of spaced-apart openings outside the loop of optical fiber through on side of the tray; and a pair of spaced-apart parallel rods attached to the support frame and extending upwardly therefrom through the openings in each tray, said openings being slideably joined to the pair of parallel rods.

2. The closure of claim 1 wherein the parallel rods are cylindrical and metallic, and the openings comprise cylindrical holes in the fiber connection tray.

3. The closure of claim 2 wherein the parallel rods are made from steel.

4. The closure of claim 2 wherein the cylindrical rods comprise a center section of a generally U-shaped wireform whose top and bottom sections reside in different parallel planes—each being perpendicular to the center section.

5. The closure of claim 4 wherein the support frame includes a plurality of molded details that are shaped to receive and support the bottom section of the U-shaped wireform without the use of fasteners.

6. The closure of claim 1 wherein each tray includes at least one organizing module which is mounted therein, each module including compliant means for holding a plurality of optical fiber connective arrangements which may include different kinds of connective arrangements.

7. The optical fiber closure of claim 2, wherein said closure includes optical fiber breakout means into which optical fibers from each cable to be spliced extend for facilitating the transition between optical fibers as grouped in the cables to be spliced and groups of fibers to be spliced on said trays, and out of which extend a plurality of tubes, each said tube having at least one optical fiber disposed therein and extending from said optical fiber breakout into a tray.

8. The closure of claim 1 wherein the cover is substantially cylindrical having a closed end and an open end, said cable termination assembly being inserted into the open end of the cover.

9. A compact closure for cables containing optical fiber, said closure comprising:

a cover having a closed end and an open end; and a cable termination assembly which fits into the open end of the cover, the cable termination assembly including:

cable entry means including an environmental seal for enabling cables to enter the closure while excluding unwanted debris;

a support frame that extends from cable entry means and has a free end which is enclosed within the cover;

one or more trays mounted on the support frame for storing loops of optical fiber therein, said one or more trays being adapted to hold optically connected portions of optical fibers, each tray including a pair of spaced-apart openings along one end thereof outside the loop of optical fiber; and spaced-apart parallel rods attached to the support frame and extending upwardly therefrom, said parallel extending through the spaced-apart openings in the trays.

10. A compact closure for cables containing optical fiber, said closure comprising a cable termination assembly surrounded by a protective cover, the cable termination assembly comprising:

a support frame for supporting a plurality of trays;

a pair of spaced-apart, parallel rods positioned on the support frame;

a plurality of trays for storing loops of optical fiber therein and for holding optical fiber connecting arrangements, each tray including a pair of spaced-apart openings outside the loop of optical fiber at one end of the tray that are complementary to the parallel rods and are slideably connected thereto.

11. The compact closure of claim 10 wherein the spaced-apart, parallel rods comprise the central portion of a generally U-shaped metallic wireform, and the spaced-apart openings comprise a pair of holes molded into one end of the tray.

12. The closure of claim 10 wherein the cover is substantially cylindrical having a closed end and an open end, said cable termination assembly being inserted into the open end of the cover.

* * * * *